(12) United States Patent
Hamm et al.

(10) Patent No.: US 8,556,597 B2
(45) Date of Patent: Oct. 15, 2013

(54) METERING UNIT

(75) Inventors: Thomas Hamm, Ingelfingen (DE); Christoph Hettinger, Ingelfingen (DE)

(73) Assignee: Buerkert Werke GmbH, Ingelfingen (DE)

( * ) Notice: Subject to any disclaimer, the term of this patent is extended or adjusted under 35 U.S.C. 154(b) by 488 days.

(21) Appl. No.: 12/858,450

(22) Filed: Aug. 18, 2010

(65) Prior Publication Data

US 2011/0041936 A1 Feb. 24, 2011

(30) Foreign Application Priority Data

Aug. 21, 2009 (DE) .................. 10 2009 038 492

(51) Int. Cl.
*E03B 5/00* (2006.01)

(52) U.S. Cl.
USPC .............. 417/395; 417/413.1; 137/565.11

(58) Field of Classification Search
USPC ............ 417/495, 413.1; 137/565.11; 73/1.01
See application file for complete search history.

(56) References Cited

U.S. PATENT DOCUMENTS

| | | | | |
|---|---|---|---|---|
| 3,996,904 | A * | 12/1976 | Kobuki et al. | 123/328 |
| 4,047,844 | A | 9/1977 | Robinson | |
| 7,717,682 | B2 * | 5/2010 | Orr | 417/395 |
| 2002/0020445 | A1 | 2/2002 | Hettinger | |
| 2002/0092869 | A1 * | 7/2002 | Tiemann et al. | 222/249 |
| 2006/0073036 | A1 * | 4/2006 | Pascual et al. | 417/413.1 |
| 2008/0283550 | A1 * | 11/2008 | Nighy et al. | 222/1 |
| 2010/0108721 | A1 * | 5/2010 | Andermatt | 222/335 |
| 2011/0005606 | A1 | 1/2011 | Bartels | |
| 2011/0206541 | A1 * | 8/2011 | Yokozawa et al. | 417/271 |

FOREIGN PATENT DOCUMENTS

| | | |
|---|---|---|
| DE | 102005058080 A1 | 6/2007 |
| DE | 202007007927 U1 | 8/2007 |
| DE | 102008013492 A1 | 9/2008 |
| DE | 102008042071 A1 | 3/2009 |
| EP | 2153495 | 2/2010 |
| WO | 2004090334 A1 | 10/2004 |

OTHER PUBLICATIONS

German Search Report.
Manual—"Micro-Dosiereinheit Typ 7616".
European Search Report dated Dec. 7, 2010.

* cited by examiner

*Primary Examiner* — Peter J Bertheaud
*Assistant Examiner* — Dominick L Plakkoottam
(74) *Attorney, Agent, or Firm* — Carlson, Gaskey & Olds, PC

(57) ABSTRACT

A highly precise and extremely compact metering unit for fluid media has a pump, two valves, and a fluid communication base with two ports, pump and valve channels, and a pump chamber. The pump is mounted on the pump chamber. The pump channels communicate with the pump chamber and the valves. The valve channels communicate with the valves and the ports. The pump and the two valves are arranged one beside the other on the same side of the fluid communication base.

16 Claims, 6 Drawing Sheets

US 8,556,597 B2

METERING UNIT

RELATED APPLICATION

This application claims priority to German Application No. 10 2009 038 492.8, which was filed Aug. 21, 2009.

FIELD OF THE INVENTION

This invention relates to a metering unit for precisely metering small amounts of fluid or gas in the μl range, which substantially consists of a fluid communication base, a pump, and two valves. Furthermore, this invention relates to a method for operating the metering unit.

BACKGROUND

Syringe pumps, diaphragm pumps, or peristaltic pumps usually are employed to precisely meter aggressive media. Depending on their construction, these pumps have disadvantages for certain applications. Syringe pumps are expensive due to the required electronic actuation and cannot deliver continuously. Peristaltic pumps and diaphragm pumps are too inaccurate for precise metering; in addition, diaphragm pumps only can deliver in one direction and cannot tightly close the medium against a backpressure.

However, there is already known a metering unit with which medium can be delivered in two directions, and which substantially consists of a fluid communication base, a pump, and two valves.

Such a metering unit is offered, for example, by the firm Bürkert as micrometering unit, type 7616. In this metering unit, the pump is arranged on one side of the fluid communication base, which cooperates with a pump chamber located on the same side of the fluid communication base. On the opposite side of the fluid communication base, the two valves are arranged. The pump is connected with the two valves via fluid passages, which extend through the fluid communication base from one side of the fluid communication base to the opposite side of the fluid communication base.

SUMMARY

The subject metering unit provides an extremely space-saving and compact construction, which is achieved in that the pump and both valves are arranged one beside the other on the same side of the fluid communication base.

Fluid passages that connect a pump chamber and a valve with each other are referred to as "pump channels." Fluid passages that extend between a port of the metering unit and a valve are referred to as "valve channels."

In the fluid communication base, two pump channels which initially extend through the fluid communication base just as in accordance with the prior art, are guided from the pump chamber on the side opposite the same up to the valve ports on the opposite side, and from there back again through the fluid communication base to one valve each. The valve channels, which extend through the fluid communication base, likewise are guided from the valves on the side opposite the same up to the two ports of the metering unit. The fluid passages are closed with a flat gasket and end plate. This type of channel routing provides for arranging the pump and the two valves on the same side.

In an advantageous embodiment of the metering unit, the fluid communication base is substantially cuboid. On one side face, the pump and both valves are arranged one beside the other, and on a side face perpendicular thereto the two ports of the metering unit are arranged, whereby the same are easily accessible for the user.

A diaphragm pump and 2/2-way solenoid valves are used in one example embodiment. The pump stroke can be adjusted very accurately with an adjusting screw running in a fine thread which is arranged inside the end plate.

In a further embodiment, the fluid communication base forms a compact unit with a cover mounted thereon and firmly connected with the same, in which all components such as pump and valves as well as control electronics are arranged. As a result, the metering unit is robust to external influences and the devices located in the cover are protected.

In one embodiment, the two fluidic ports of the metering unit in the fluid communication base are arranged inside two pedestals located one beside the other, which extend through recesses of a flange plate which is attached to the fluid communication base with screws, for example. Holes are provided in the flange plate to mount the flange plate on an external connecting plate.

Alternatively, a threaded plate is connected to the fluid communication base, into whose recesses extending through the same the two pedestals protrude. On a side facing away from the fluid communication base, the plate includes threads inside the recesses for screwing in hose connectors.

This geometry and design of the metering unit ports as pedestals molded to the fluid communication base allows a flexible coupling to flange or threaded plates.

Advantageously, the pump includes a coupling element which is configured as a two-armed, pivotally mounted lever and which is connected to a diaphragm. The coupling element experiences its motional force in a known manner for example by a magnetic drive. A first lever arm can release and close the pump chamber and a second lever arm cooperates with the adjusting screw, whereby the pump stroke is defined.

The method of operating a metering unit includes retrieving predefined pump cycles, each of which successively comprises a first phase in which the input-side valve opens and closes again, a second phase in which a pump stroke is effected, and a third phase in which the output-side valve opens and closes again, wherein the first phase overlaps with the second phase and the third phase overlaps with the second phase.

A calibration is effected by adjusting the size of the pump stroke. For accurately measuring the volume or weight of the medium delivered per pump stroke a predetermined number of pump cycles is carried out, e.g. one hundred, and the volume delivered is divided by the number of cycles. Alternatively, a calibration is effected by adjusting the number of pump cycles, which is required to obtain a defined weight of dosed medium. In any case, the dosed volume is then independent of manufacturing tolerances of the device, or the same can be compensated, and the fluid communication base can be manufactured at low cost by injection molding.

Further features and advantages of the invention can be taken from the following description of a preferred embodiment with reference to the attached drawings.

DETAILED DESCRIPTION

Figure 1:
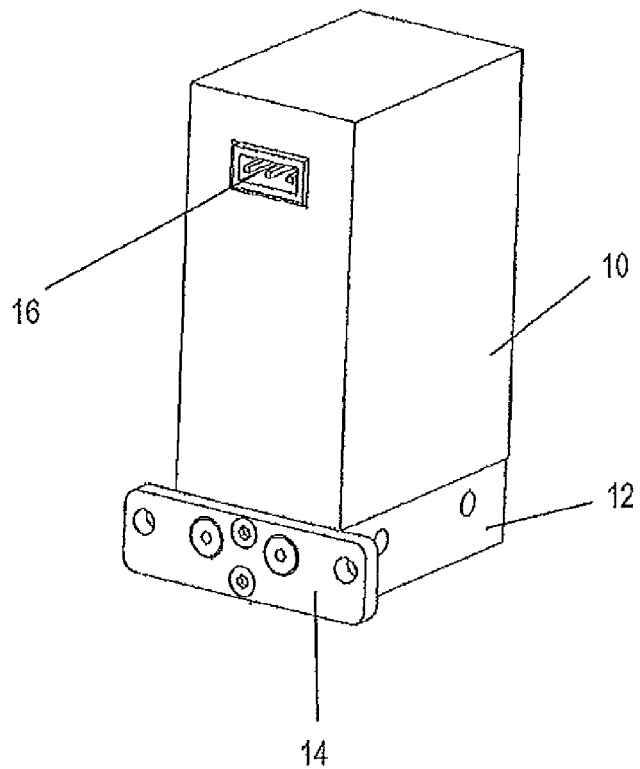
FIG. 1 shows a perspective view of a metering unit.
Figure 2:
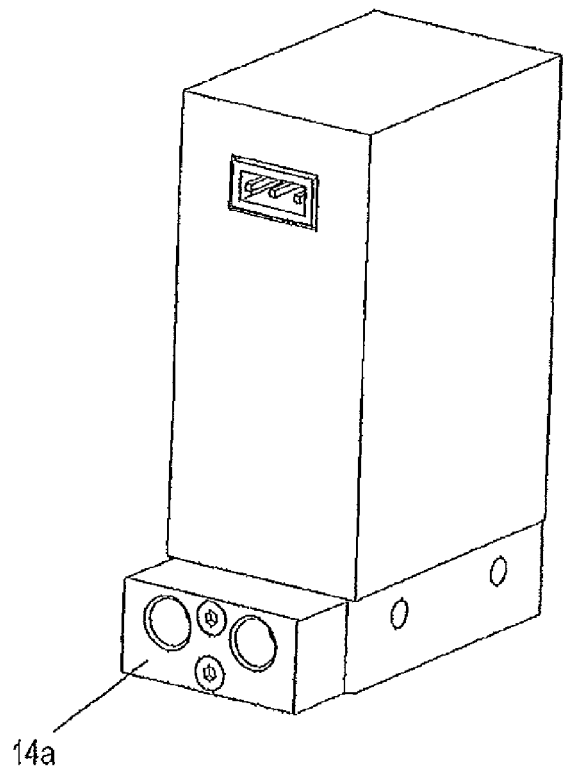
FIG. 2 shows a perspective view of the metering unit with another configuration of fluidic ports.

As shown in FIGS. 1 and 2, the metering unit is a generally cuboid device. A cover 10, which also can be referred to as hood, is mounted on a fluid communication base or fluid body 12 and encloses all components of the metering unit. In FIG. 1, a flange plate 14 is screwed to the fluid body 12. A connector 16 with three contacts is accessible on a side face of the cover 10. The embodiment in FIG. 2 differs from the one shown in FIG. 1 merely by including a threaded plate 14a which is screwed to the fluid body 12 instead of the flange plate 14.

Figure 3:
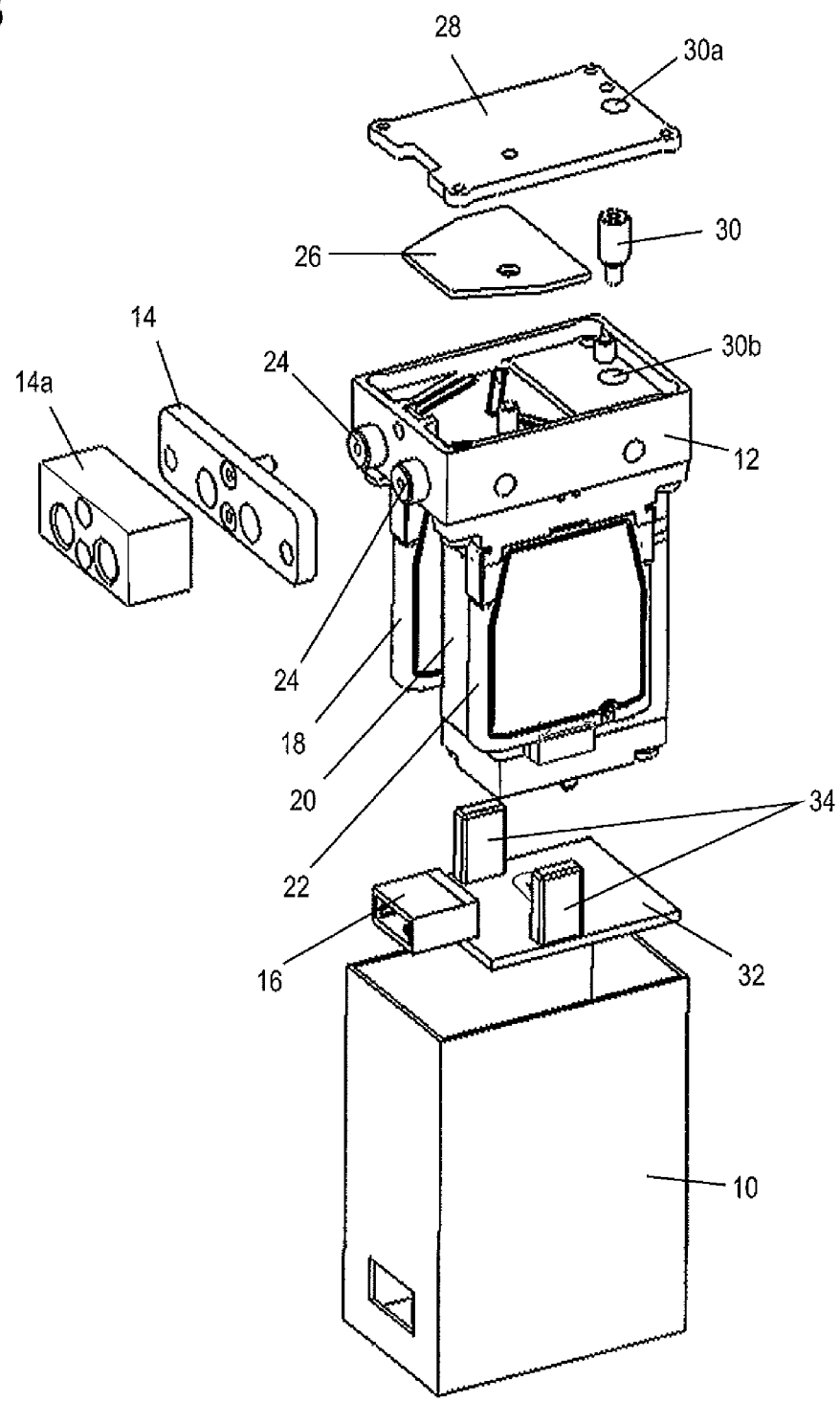
FIG. 3 shows an exploded view of the metering unit.
Figure 6:
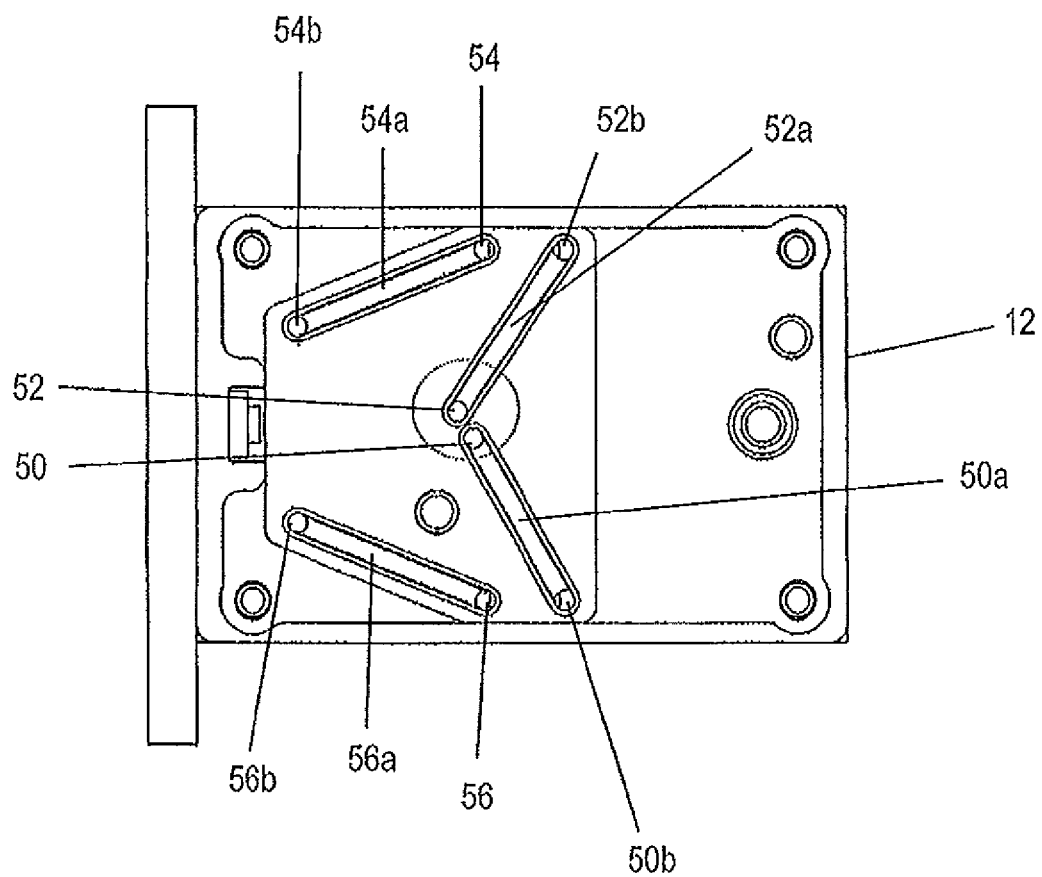
FIG. 6 shows a bottom surface of the fluid body with channel portions incorporated therein.

For better illustration, the metering unit is turned upside down in FIG. 3. On one side of the fluid body 12, a first valve 18, a pump 20 and a second valve 22 are mounted one beside the other. The fluid communication base 12 has the shape of a flat cuboid. On a side face which is perpendicular to the main surface on which the valves 18, 22 and the pump 20 are mounted, two pedestals 24 are disposed, which each form a fluidic port and are received by corresponding openings of the flange plate 14 and threaded plate 14a, respectively. On the main surface of the fluid body 12, which faces away from the valves and the pump, portions of fluid passages are disposed which are shown more clearly in FIG. 6, and which are covered by a sealing plate 26. An end plate 28 closes the main side of the fluid body 12 facing away from the valves and the pump, which at its corners includes threaded holes for fastening screws with which the entire construction is held together. An adjusting screw 30 runs in a fine thread of a threaded hole 30a of the end plate 28 and extends through a hole 30b in the fluid communication base 12. An electronic assembly 32, which here is only schematically shown as a plate, includes connectors 34 for the valves 18, 22 and the pump 20 as well as the connector 16 that is accessible from outside.

Figure 4:
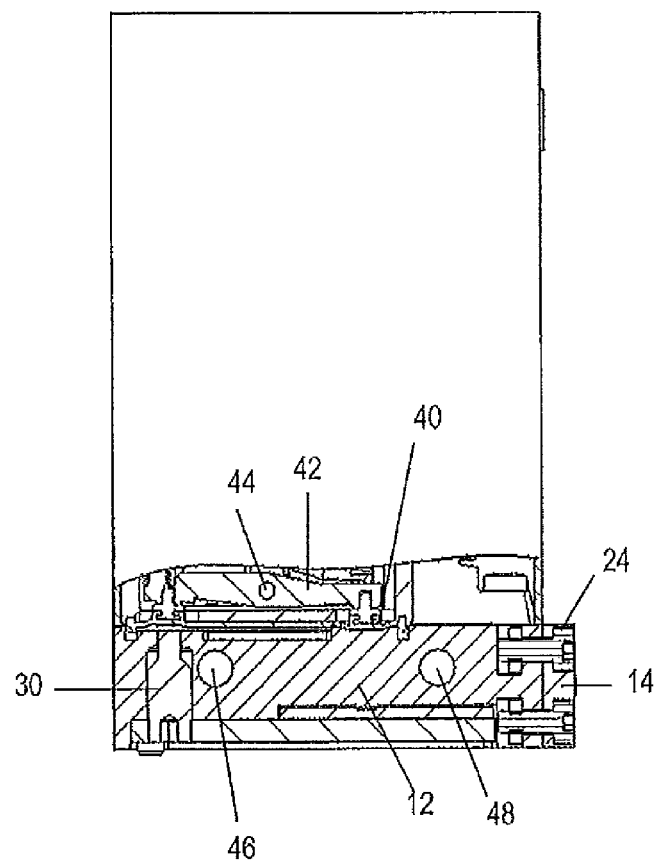
FIG. 4 shows partial section of the metering unit in a region of its pump.

FIG. 4 shows a section through the pump and the fluid communication base. The pump is a diaphragm pump. The diaphragm of the pump cooperates with a pump chamber 40, which is formed on an adjacent main surface of the fluid body 12. The diaphragm is connected to an arm of a two-armed actuator 42, which forms a rocker and is pivotally mounted on an axle 44. The second arm of the actuator 42 is engaged by an end of the adjusting screw 30. FIG. 4 furthermore shows two cross holes 46, 48 of the fluid body 12.

Figure 5:
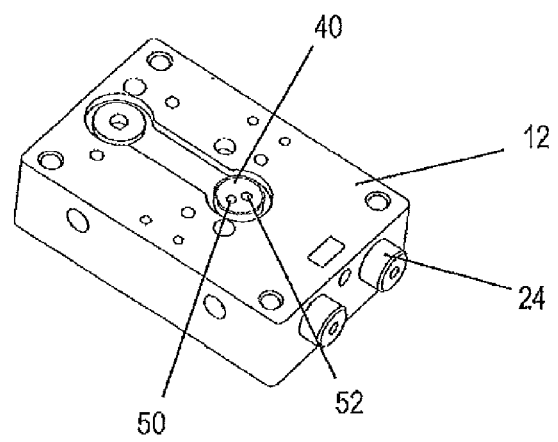
FIG. 5 shows a perspective view of a fluid body.

As shown in FIG. 5, two channels 50, 52 open into the pump chamber 40. These channels 50, 52 traverse the fluid body 12 and end on a bottom surface of the body 12 shown in FIG. 6, where they change into channel portions 50a, 52a, which in turn end at channels 50b, 52b which traverse the fluid body 12 and lead to one of the two valves 18, 22 on the opposite main side of the fluid body 12. From the valves 18, 22 two further fluid channels 54, 56 extend straight through the fluid body 12 and change into channel portions 54a, 56a on the opposite main surface of the fluid body 12. These channel portions 54a, 56a end at fluid passages 54b, 56b, which lead to the ports of the flange plate 14 and threaded plate 14a, respectively.

The metering unit is completely symmetric and therefore can be operated in two opposite flow directions. The two fluidic ports at the flange plate 14 and threaded plate 14a, respectively, can be operated both as inlet and as outlet. The flow direction is determined by the sequence of actuating the valves 18, 22. The pump stroke of the diaphragm pump is adjusted by using the adjusting screw 30.

Figure 7:
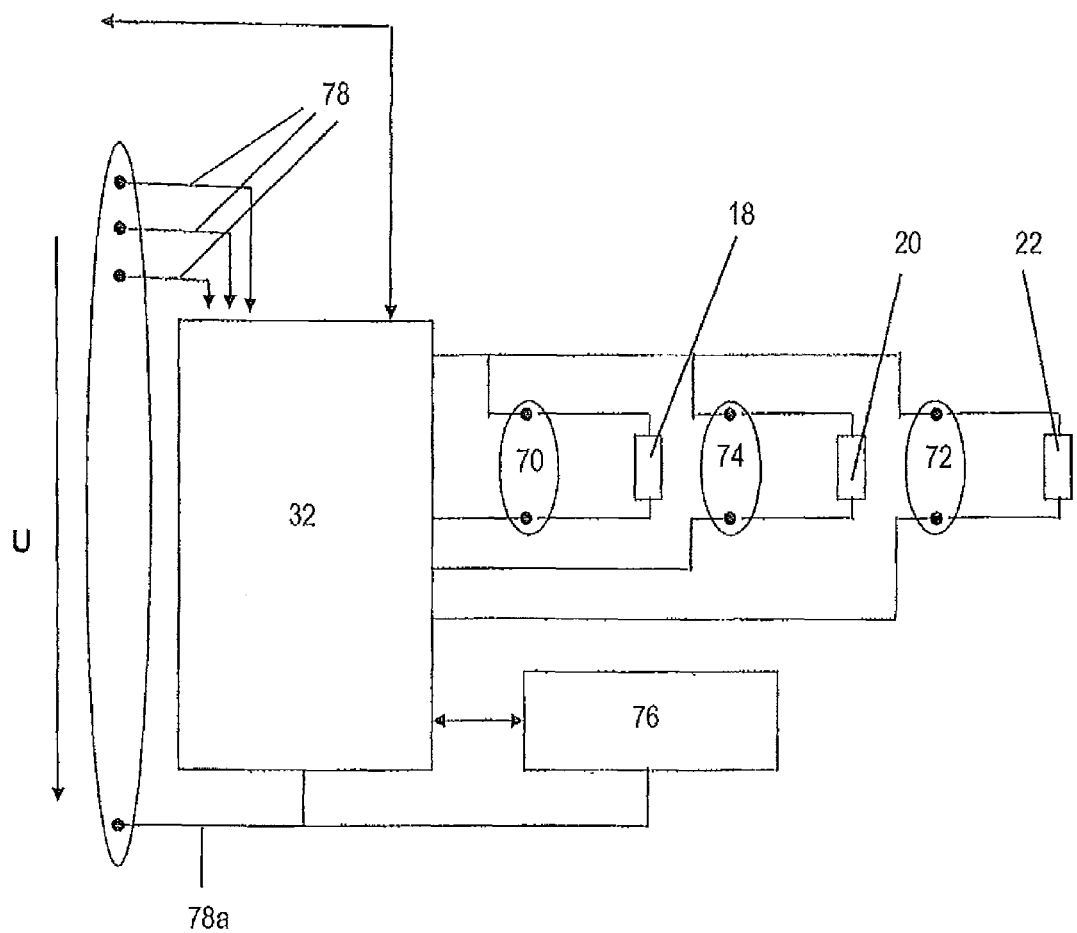
FIG. 7 shows a simplified circuit diagram for controlling the metering unit.

In FIG. 7, the control electronics of the metering unit is shown very schematically. The electronic assembly 32, which can include a microcontroller with associated control software, has ports 70, 72 for the two valves 18, 22 and a port 74 for the pump 20. Sensors 76 can also be connected with the electronic assembly 32. The three contacts of the connector 16 correspond to three control lines 78, which are connected with inputs of the electronic assembly 32. The reference potential is supplied to the electronic assembly 32 and the sensors 76 via a further line 78a. Between the line 78a and each of the lines 78 the operating voltage U furthermore is supplied.

Depending on which of the control lines 78 the operating voltage U is applied to, either the one or the opposite flow direction or a flushing mode of the metering unit is obtained.

Figure 8:
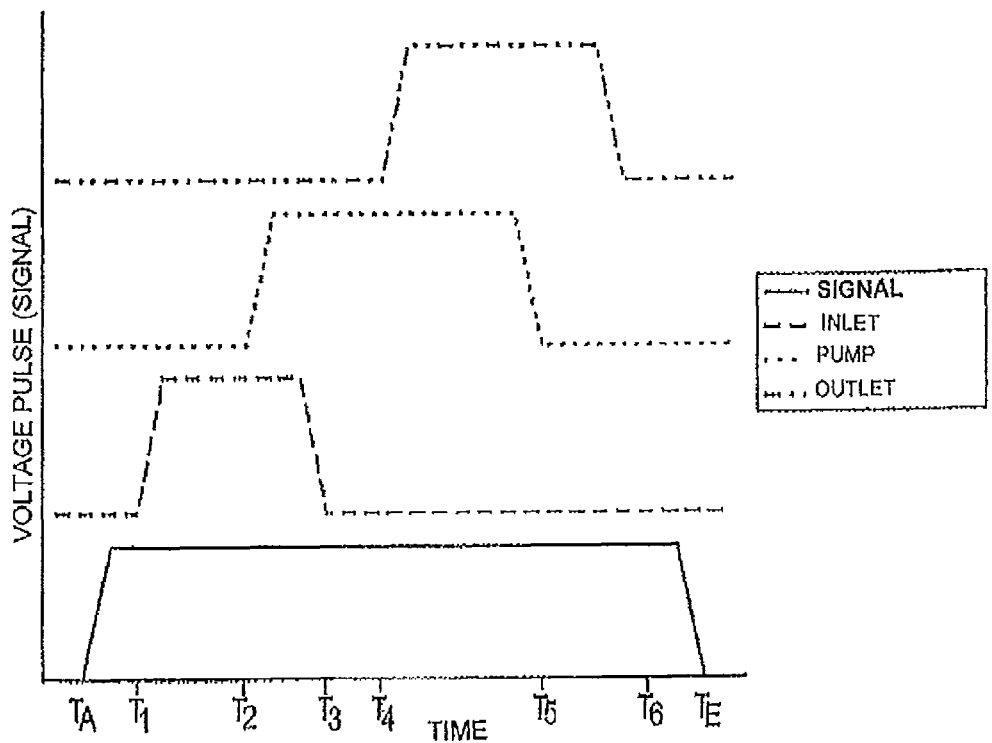
FIG. 8 shows a flow diagram of a pump cycle.

The metering unit preferably is operated in individual or successive pump cycles, which all are the same. Such a pump cycle is shown in FIG. 8 by way of example. The application of the operating voltage U to one of the control lines 78 from the time $T_A$ to $T_E$ is shown in FIG. 8 with a continuous line. The turn-on function of the input-side valve is illustrated in FIG. 8 with a broken line. The valve opens at the time $T_1$. The function of the pump which starts a suction stroke at the time $T_2$ is shown in FIG. 8 with a dotted line. At the time $T_3$, the input-side valve closes. The turn-on function of the output-side valve is shown in FIG. 8 with a dash-dotted line. This valve opens at the time $T_4$. At the time $T_5$, the pump has terminated its discharge stroke. The output-side valve closes at the time $T_6$. Thus, it can be seen that the opening times of the valves overlap with the function of the pump.

When the operating voltage U is applied to another of the control lines 78, the sequence of the actuation of the two valves is reversed, whereby the opposite flow direction is obtained.

The third one of the control lines 78 can be used to keep both valves open by applying the operating voltage U and lifting the diaphragm of the diaphragm pump from the pump chamber, so that the entire metering unit can be flushed.

Due to the calibration of the metering unit, which is possible with the method of the invention, a very high metering accuracy can be achieved without having to produce the various functional parts of the metering unit involved with low tolerances. Therefore, simple injection molding techniques can be used.

The preferred method consists in adjusting the volume delivered with each individual pump stroke to a desired value by using the adjusting screw 30. For accurate measurement of the volume delivered, a certain number of pump cycles is performed, for example, one hundred pump cycles. The total volume measured is then divided by the number of pump cycles. The volume measurement can be effected by weight determination. In this way, the volume delivered per pump cycle possibly is incrementally adjusted to the desired value, for example, 5 µl.

Another method consists in determining the number of pump cycles, which is required to deliver a certain volume which possibly is again measured by weight determination. The volume is then divided by the number of pump cycles required, which provides the volume delivered per pump cycle.

In normal use, as also in the calibration, the metering unit preferably is controlled by software.

A number of additional options are available. For example, the metering unit can be coupled with various sensors, in order to detect operating parameters. Furthermore, the electronic assembly can be equipped with an interface via which a parametrization of all control functions of the metering unit can be effected. To accelerate the switching operations, the drives of the valves and the pump can briefly be overexcited. In combination therewith or also separately, the drives can be operated with reduced power, in order to save energy.

Although the invention has been described hereinabove with reference to a specific embodiment, it is not limited to this embodiment and no doubt further alternatives will occur to the skilled person that lie within the scope of the invention as claimed.

What is claimed is:

1. A metering unit comprising:
   a pump;
   at least two valves;
   a fluid communication base which is formed with at least two ports, pump channels, valve channels, and a pump chamber; and
   wherein:
   the pump is mounted on the pump chamber,
   the pump channels communicate with the pump chamber, and the valves, and the valve channels communicate with the valves and the ports,
   the pump and the valves are arranged adjacent to each other on a common connection face of the fluid communication base,
   depressions and conduits defining all pump channels and valve channels being exclusively formed in the fluid communication base, and
   sections of the pump channels and of the valve channels extending in the fluid communication base on a side opposite said common connection face, and being closed by a sealing plate and an end plate.

2. The metering unit according to claim 1, wherein the pump channels include at least a first and second pump channel, the first pump channel being connected with a first valve of said at least two valves and with the pump chamber, and the second pump channel being connected with a second valve of said at least two valves and with the pump chamber.

3. The metering unit according to claim 2, wherein the valve channels include at least first and second valve channels, the first valve channel connecting the first valve with a first port of said at least two ports, and the second valve channel connecting the second valve with a second port of said at least two ports.

4. The metering unit according to claim 1, wherein the fluid communication base is substantially cuboid, the pump and the valves are connected on a first side face of the fluid communication base, and the ports are located on a second side face which is perpendicular to the first side face.

5. The metering unit according to claim 1, wherein the valves are 2/2-way valves.

6. The metering unit according to claim 1, wherein a pump stroke adjusting screw and fastening elements for the pump and the valves extend through the fluid communication base and the end plate.

7. The metering unit according to claim 6, wherein the pump has a pump chamber, a diaphragm, and a two-armed actuating lever with a first lever arm connected to the diaphragm, wherein the pump stroke adjusting screw engages a second lever arm of the actuating lever.

8. The metering unit according to claim 1, wherein the end plate includes holes for fastening screws with which the end plate is fastened to the fluid communication base.

9. The metering unit according to claim 8, including control electronics enclosed between the end plate and the fluid communication base.

10. The metering unit according to claim 9, wherein the control electronics includes a microcontroller.

11. The metering unit according to claim 1, wherein the fluid communication base comprises a single-piece structure.

12. The metering unit according to claim 11, wherein the single-piece structure comprises a cuboid.

13. A metering unit comprising:
   a pump;
   at least two valves;
   a fluid communication base which is formed with at least two ports, pump channels, valve channels, and a pump chamber; control electronics; and
   a cover;
   wherein:
   the pump channels communicate with the pump chamber; and the valves and the valve channels communicate with the valves and the ports,
   the pump and the valves are arranged adjacent to each other on a common connection face of the fluid communication base,
   depressions and conduits defining all pump channels and valve channels being exclusively formed in the fluid communication base, and
   wherein the pump, the valves, and the control electronics are housed inside the cover, the cover being firmly connected with the fluid communication base.

14. The metering unit according to claim 13, wherein the control electronics includes a microcontroller that is enclosed between the cover and the fluid communication base.

15. The metering unit according to claim 13, wherein the fluid communication base comprises a single-piece structure.

16. The metering unit according to claim 15, wherein the single-piece structure comprises a cuboid.

* * * * *